United States Patent
Molbach et al.

(10) Patent No.: US 9,662,945 B2
(45) Date of Patent: May 30, 2017

(54) ROBOTIC TIRE CHANGER USER INTERACTION PROCEDURES FOR SAFETY AND CONVENIENCE

(71) Applicant: Hunter Engineering Company, St. Louis, MO (US)

(72) Inventors: Steve Molbach, Ballwin, MO (US); Joel A. Clasquin, Highland, IL (US); Jeffrey P. Talbott, Florissant, MO (US)

(73) Assignee: Hunter Engineering Company, St. Louis, MO (US)

(\*) Notice: Subject to any disclaimer, the term of this patent is extended or adjusted under 35 U.S.C. 154(b) by 322 days.

(21) Appl. No.: 14/506,014

(22) Filed: Oct. 3, 2014

(65) Prior Publication Data
US 2015/0096692 A1    Apr. 9, 2015

Related U.S. Application Data

(60) Provisional application No. 61/887,035, filed on Oct. 4, 2013.

(51) Int. Cl.
*B60C 25/05* (2006.01)

(52) U.S. Cl.
CPC .................. *B60C 25/0515* (2013.04)

(58) Field of Classification Search
CPC ............ B60C 25/0515; B60C 25/0548; B60C 25/0551; B60C 25/0554; B60C 25/0557; B60C 25/056
See application file for complete search history.

(56) References Cited

U.S. PATENT DOCUMENTS

| | | | |
|---|---|---|---|
| 6,877,544 B2 | 4/2005 | Kane et al. | |
| 7,089,987 B2 * | 8/2006 | Gonzaga | B60C 25/138 157/1.17 |
| 7,264,032 B2 | 9/2007 | Peinelt et al. | |
| 7,296,351 B2 * | 11/2007 | Gonzaga | B60C 25/138 157/1.17 |
| 7,355,687 B2 * | 4/2008 | Voeller | B60C 11/24 356/139.09 |
| 7,495,755 B2 | 2/2009 | Voeller et al. | |

(Continued)

*Primary Examiner* — David B Thomas
(74) *Attorney, Agent, or Firm* — Polster, Lieder, Woodruff & Lucchesi, LC

(57) ABSTRACT

A robotic tire changing machine having a processing system is configured with software instructions to carry out the procedures for tire mounting and demounting, and with software instructions to detect and respond to abnormal operating conditions during a tire mounting or demounting procedure. A specific response to the detection of an abnormal operating condition by the processing system is guided by the software instructions and is associated with the particular state in which the tire changing machine is in and/or the current step of an ongoing tire mounting or demounting procedure. The specific responses may include, but are not limited to, providing a prompt or instruction to an operator, providing a warning to an operator, carrying out one or more additional procedural steps, suspending operations to await an operator action, or limiting movement of articulated components during the tire mounting or demounting procedure.

21 Claims, 4 Drawing Sheets

(56) References Cited

U.S. PATENT DOCUMENTS

| | | | | |
|---|---|---|---|---|
| 7,715,024 | B2* | 5/2010 | Sotgiu | B60C 25/0554 |
| | | | | 356/139.09 |
| 7,738,120 | B2* | 6/2010 | Braghiroli | B60C 25/0554 |
| | | | | 356/614 |
| 7,768,632 | B2* | 8/2010 | Sotgiu | B60C 25/0554 |
| | | | | 356/139.09 |
| 8,276,641 | B2* | 10/2012 | Matteucci | B60C 25/138 |
| | | | | 157/1.24 |
| 8,284,390 | B1* | 10/2012 | Clasquin | B60C 25/0554 |
| | | | | 356/139.01 |
| 8,537,347 | B1* | 9/2013 | Clasquin | B60C 25/0554 |
| | | | | 356/139 |
| 8,613,303 | B1 | 12/2013 | Hanneken et al. | |
| 8,770,254 | B1* | 7/2014 | Hanneken | B60C 25/138 |
| | | | | 157/1.17 |
| 8,783,326 | B1 | 7/2014 | Vaninger et al. | |
| 8,991,038 | B2* | 3/2015 | Lawson | B60C 25/0515 |
| | | | | 29/802 |
| 9,061,555 | B2* | 6/2015 | Mallett | B60C 25/0515 |
| | | | | 157/1.24 |
| 2009/0293603 | A1* | 12/2009 | Douglas | G01B 21/12 |
| | | | | 73/146 |

* cited by examiner

ROBOTIC TIRE CHANGER USER INTERACTION PROCEDURES FOR SAFETY AND CONVENIENCE

CROSS-REFERENCE TO RELATED APPLICATIONS

The present application is related to, and claims priority from, U.S. Provisional Patent Application Ser. No. 61/887,035 filed on Oct. 4, 2013, and which is herein incorporated by reference.

STATEMENT REGARDING FEDERALLY SPONSORED RESEARCH

Not Applicable.

BACKGROUND OF THE INVENTION

The present application is related to the operation of tire changing machines, and in particular to operating procedures and features associated with robotic tire changing machines to facilitate safe operation and operator convenience.

Tire changing machines are designed to aid an operator in the task of mounting or dismounting a pneumatic tire from a supporting wheel rim. In a basic form, such as shown in FIG. 1, a tire changing machine provides an operator with a means to secure the wheel rim for controlled axial rotation, and with a set of tools on articulated arms for engaging the pneumatic tire to either dismount the tire from the wheel rim, or to mount the tire to the wheel rim as the wheel rim is rotated about an axis. Entry level tire changing machines require the operator to control the powered rotational movement of the wheel rim and to move the various tools into appropriate operating positions as needed during a tire mounting or demounting procedure. Advanced tire changing machines, such as the robotic tire changing machine shown in FIG. 2, include processing systems configured with software instructions to control movement of the wheel rim and articulated arms in order to automate most steps in the tire mounting or demounting procedures.

While an advanced or robotic tire changing machine can be configured with software instructions for carrying out tire mounting and demounting operations for a wide range of vehicle wheel assemblies, there exist a near infinite set of tire and wheel combinations, and it is possible for a robotic tire changing machine to encounter problems during automated operations which require manual assistance in the placement or movement of a tool or wheel assembly from an operator, or which could potentially present safety hazards to the operator. Accordingly, there is a need to provide robotic tire changing machines with a means for identifying conditions in which manual assistance from an operator is required to safely complete a tire mounting or demounting operation, as well as for directing operator attention to potential safety hazards or operating conditions.

BRIEF SUMMARY OF THE INVENTION

In one embodiment a robotic tire changing machine of the present disclosure having a processing system configured with software instructions to carry out the procedures for tire mounting and demounting, is further configured to detect and respond to abnormal operating conditions during a tire mounting or demounting procedure. A specific response to the detection of an abnormal operating condition by the processing system is guided by the software instructions and is associated with the particular state in which the tire changing machine is in and/or the current step of an ongoing tire mounting or demounting procedure. The specific responses may include, but are not limited to, providing a prompt or instruction to an operator, providing a warning to an operator, carrying out one or more additional procedural steps, suspending operations to await an operator action, or limiting movement of articulated components during the tire mounting or demounting procedure.

In a further embodiment, a robotic tire changing machine of the present disclosure having a processing system configured with software instructions to carry out the procedures for tire mounting and demounting, is further configured to carry out one or more supplemental steps during the procedures for tire mounting and/or demounting in response to specific operating conditions. These operating conditions may include, but are not limited to, acquired wheel dimensional measurements being within a predetermined range, operator defined conditions such as "same again" type operations, and an unexpected amount of manual operator input which is suggestive of operator uncertainty in the current operational procedure.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
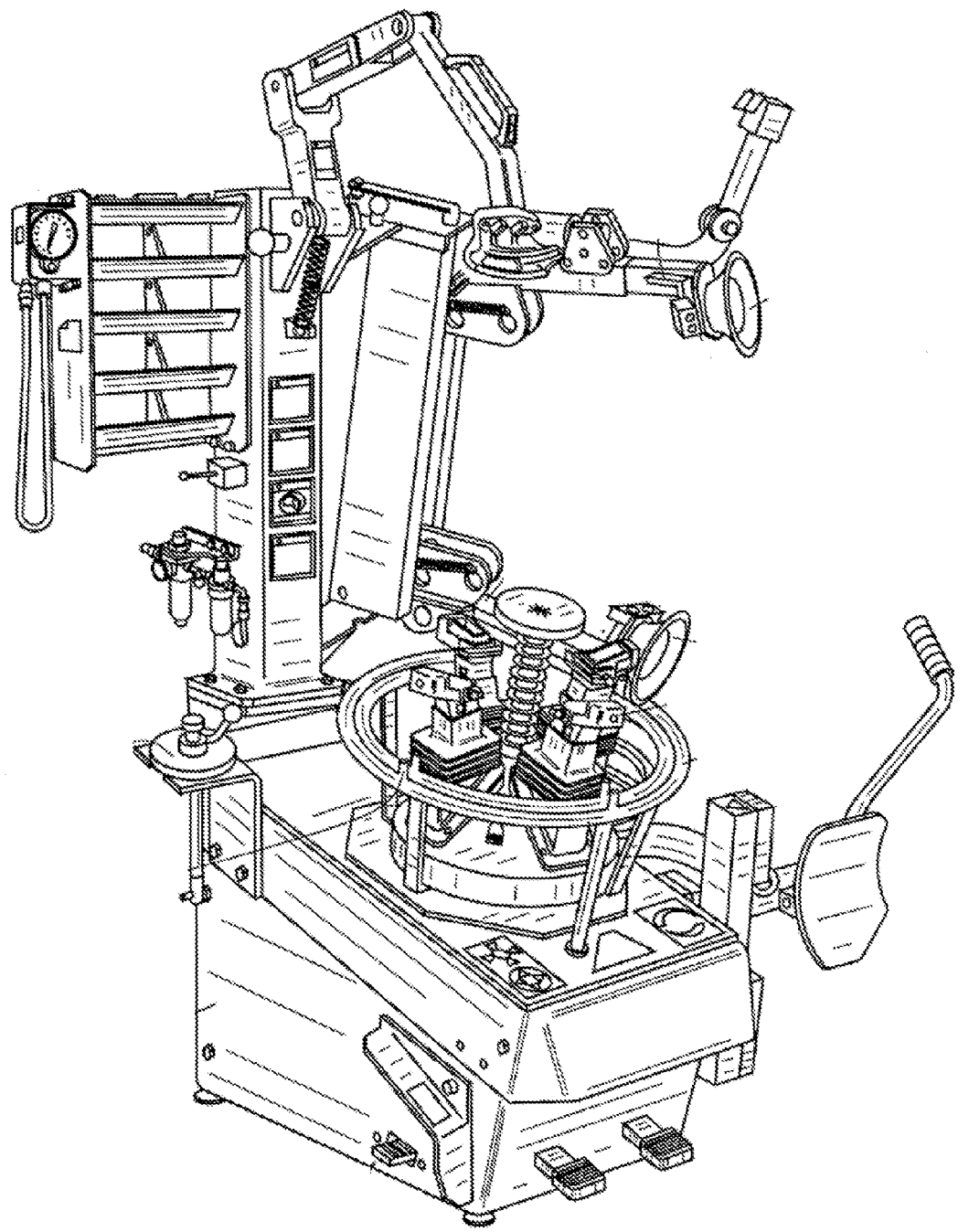
FIG. 1 is a perspective view of a prior art tire changing machine which relies on operator control throughout a tire mounting or demounting operation.
Figure 2:
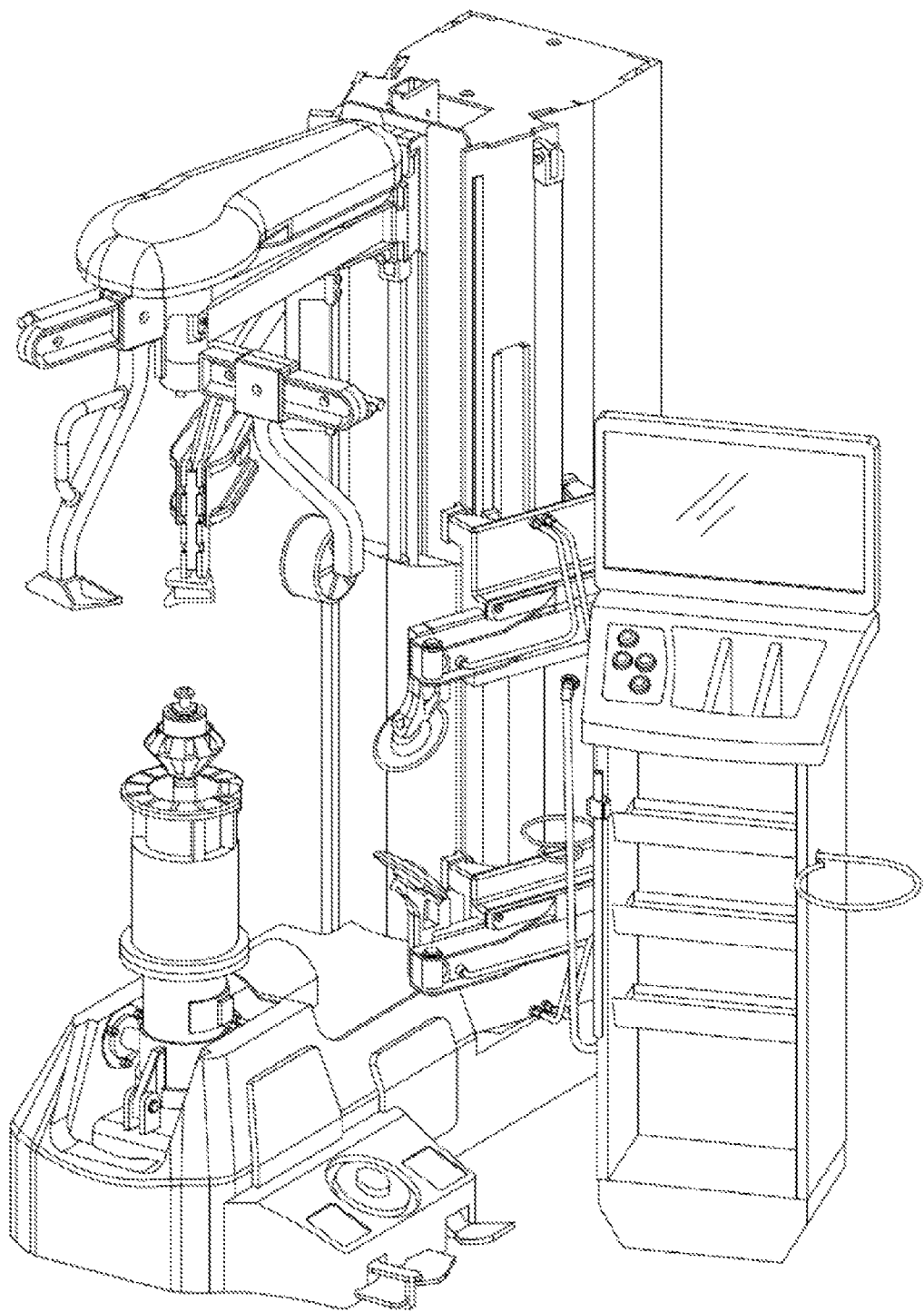
FIG. 2 is a perspective view of a prior art automated tire changing machine which operates under control of a processing system and software instructions.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure. It will be understood by those of ordinary skill in the art that where the present invention is described in the context of a computer or processor configured with software instructions to carry out a specific procedure, the corresponding steps of the procedure as set forth in the description define an associated method of the present invention independent of the specific apparatus described.

Robotic tire changing machines consist generally of a base, a drive assembly coupled to the base for receiving a vehicle wheel assembly on a spindle, a suitable clamping mechanism for securing the wheel assembly to the spindle, and a set of articulated tool assemblies which may include one or more of the following: a tire mount/demount head, a tire hook, an upper bead roller, a lower bead roller, load roller, and a bead press tool. The automated actions of the articulated tool assemblies on a robotic tire changing machine are under control of an associated processing system configured with suitable software instructions for carrying out the operational steps of tire demount and tire mount operations with a reduced amount of operator assistance. Exemplary tire changing machines are shown in U.S. Pat. No. 8,387,675 B1 to Vaninger et al. and in U.S. Pat. No. 8,307,874 B1 to Hanneken et al., both of which are herein incorporated by reference.

In a first embodiment, a robotic tire changing machine of the present disclosure includes a processing system which is configured with software instructions to carry out, with reduced assistance from an operator, automated procedures for mounting and demounting a tire to and from a wheel rim of a wheel assembly supported on a spindle for controlled rotation. The processing system is further configured with the software instructions to detect the occurrence of an abnormal operating condition during the tire mounting or demounting procedure, and to react with a specific response intended to address the detected abnormal operating condition. The specific act or actions taken by the processing system in response to the detection of an abnormal operation condition is guided by the software instructions, and is responsive to a current operating state in which the tire changing machine is in, and/or to a current operational step of an ongoing tire mounting or demounting procedure.

Those of ordinary skill in the art will recognize that the general concepts of fault detection and process termination to await an operator correction and/or system reset are well known in the automated machine field. Rather than terminating operations upon detection of a fault, the robotic tire changing machine of the present disclosure is configured with software instructions to provide an intelligent response to a detected abnormal operating condition, enabling identification of a source of the abnormal operating condition and/or implementation of responsive action to enable safe completion of a current tire mounting or demounting operation. Additional responsive actions may include, but are not limited to, temporarily suspending a procedure to await an operator action or confirmation, or limiting the subsequent movement of one or more of the articulated tool assemblies or component during the tire mounting or demounting procedure.

Figure 3:
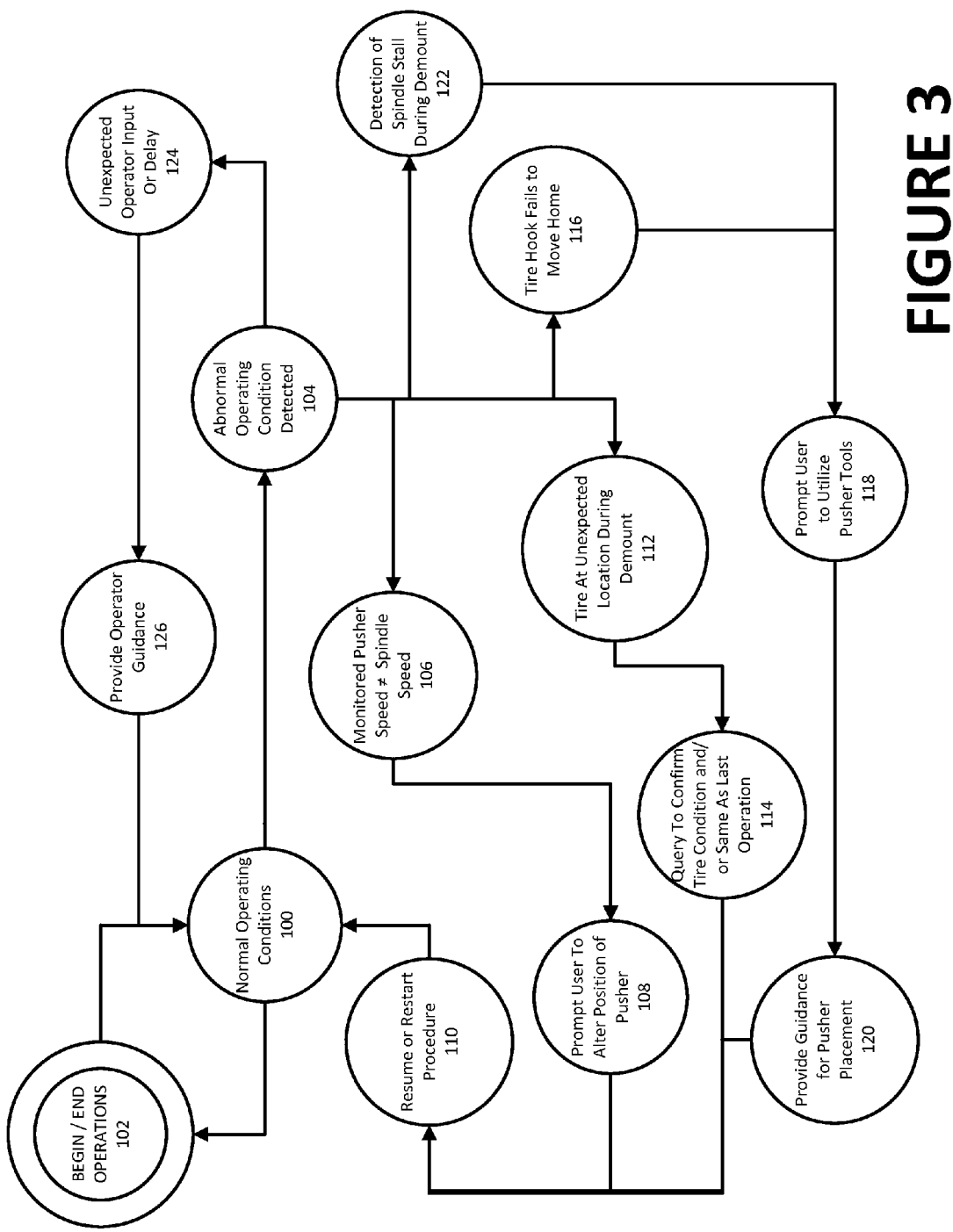
FIG. 3 is diagrammatic illustration of exemplary responses to the detection of abnormal operating conditions by a robotic tire changing machine of the present invention.

The following section illustrates, by example and with reference to FIG. 3, a variety of deviations from a normal operating state (100) that can occur during various operational steps or states between the beginning and end of an operation (102) for a robotic tire changing machine, resulting in the detection of an abnormal operating condition (104) and appropriate responses provided by a suitably configured robotic tire changing machine of the present invention. Those of ordinary skill will recognize that the present invention is not limited to the specific examples set forth herein, and further that a robotic tire changing machine of the present invention is not required to implement all of these exemplary response, and may be configured to implement different or additional responses without departing from the scope of the present invention.

For some tire changing procedures, one or more articulated pusher tools are utilized by a robotic tire changing machine to apply a pressure to the sidewall of a tire mounted on the wheel rim, as the rim is rotationally driven by the spindle. Rotational slippage between the pusher tools and the tire can be detected if a monitored rotational speed of the pusher tools about the spindle axis of rotation differs from a monitored rotational speed of the spindle supporting the clamped wheel assembly (106). Upon detecting this condition, a processing system of the robotic tire changing machine is configured with software instructions to respond by prompting the operator (108) to change the position of one or more of the pusher tools, such as by moving it rotationally to a new location, by moving it vertically downward towards the tire sidewall to exert a greater pressure on the tire, or by returning to an initial position to restart the process (110) (if necessary to reposition a TPMS sensor on the wheel rim relative to a tool component). If this condition is detected during a top bead mounting procedure, the processing system may be further configured with software instructions to delay any movement of the tire mount/demount tool head away from the wheel assembly after spindle rotation has ceased, as the tool head may remain pinched between the tire rubber and the rim edge, necessitating operator intervention.

During an initial separation or breaking of a tire bead from the wheel rim bead seat to demount the tire from the wheel rim, the tire sidewall surface is engaged by an articulated bead breaker tool assembly of the robotic tire changing machine, and pressure is applied to force the separation. If the processing system detects, such as through force-feedback sensing, engagement between a bead breaker tool assembly and the tire sidewall surface at a location which is displaced axially along the wheel rim barrel from the expected location of the trim edge of the wheel rim (112), it is possible that the tire bead has already been separated or broken. Correspondingly, failure to detect any engagement between a bead breaker tool assembly and the tire sidewall surface within an expected range of moment may indicate that the tire has already been removed from the rim. Upon detecting contact with the tire at a location displaced from the wheel rim, or upon failing to detect any contact within an expected range of movement, the processing system is configured with software instructions to query the operator (114) to confirm the current state of the tire bead (i.e. already broken and/or removed, or if the tire has the same dimensions as the last one serviced) before permitting the operation to proceed.

As part of the normal process during a tire demount operation, an articulated tire hook is inserted into a separation created between the upper wheel rim and the tire bead by the tire demount tool. The tire hook is then drawn upward, pulling the tire bead up and over the upper wheel rim to demount the tire from the rim. Due to various factors, such as tire stiffness, tire sidewall size, and improper mounting of the wheel assembly to the tire changer, the tire hook may fail to be fully drawn upward to a determined position during a normal demount operation. Upon detection of this condition (116), such as by failure of a position switch to close, excessive motor loads, fluid pressure loads, or electrical current draws, the processing system is configured with software instructions to respond by prompting the operator (118) to move a pusher tool rotationally about the wheel assembly axis of rotation and into a suitable position, such as one which is approximately opposite from a rotational position of a tire mount head tool. Once the pusher tool is properly positioned, the processing system is further configured with software instructions to engage the pusher tool downward into the tire, forcing it into the drop center of the wheel and creating more space between the tire bead and wheel near the mount head tool, at which point movement of the tire hook is re-attempted. The operator may be guided (120) by the processing system to properly position the pusher tool by either a visual display or an audible indicator, such as a continuous audible signal which terminates when the pusher tool is properly positioned within a defined region.

As part of the normal process during a tire demount operation, after the articulated tire hook is drawn upward, pulling the tire bead up and over the upper wheel rim to demount the tire from the rim, the rim is rotationally driven by the supporting spindle to fully separate the tire bead from the rim. Due to various factors, such as tire stiffness and tire sidewall size, the spindle drive system may have insufficient power to rotationally drive the wheel rim at a desired rotational speed (RPM) while a portion of the tire bead is held by the tire hook during a normal demount operation. Upon detection of an abnormally slow rotational condition or a rotational stall (122), such as through monitoring the spindle rotational speed or drive motor conditions, the processing system is configured with software instructions to respond by prompting the operator (118) to move a pusher tool rotationally about the wheel assembly axis of rotation and into a new position, such as one which is approximately opposite from a rotational position of a tire mount head tool. Once the pusher tool is properly positioned, the processing system is further configured with software instructions to engage the pusher tool downward into the tire, forcing it into the drop center of the wheel to relieve some of the binding pressure on the hook, at which time rotational movement of the spindle is re-attempted. The operator may be guided by the processing system to properly position the pusher tool during this procedure (120), or during any other procedure where pusher use is required, by either a visual display or an audible indicator, such as a continuous audible signal which terminates when the pusher tool is properly positioned within a defined region.

Once a tire mounting or demounting procedure has been initiated by an operator, the automated tire changing procedures follow a sequence of operational steps which varies little from tire to tire, absent the occurrence of an unusual condition. If an operator is unskilled in the operation of the automated tire changing machine, or is unsure of how to proceed to a next step in an operation, there may be an abnormally long delay at a stage in the procedure when the operator is required to provide input or take some specific action. Similarly, an unskilled or uncertain operator may provide abnormal or unexpected input, such as movement of a control joystick or actuation of a foot pedal, which is inconsistent with expected operator input at a current operational step. The processing system is configured with software instructions to detect when the time required to complete an operational step involving operator input becomes excessive, or when a received operator input is abnormal or inconsistent with a current operational step (124). In these cases, the processing system is configured with software instructions to respond by providing the operator with a visual display of one or more options for receiving assistance or guidance with the current operational step (126). This assistance or guidance may be in the form of procedural instructions, exemplary videos of the procedure, or other context-relevant multimedia presentations intended to educate and/or guide the operator to complete the current procedure.

Often, when carrying out a tire change service on a motor vehicle, an operator will utilize the robotic tire changing machine to replace two or more tires of the same or similar sizes in sequence. To reduce the time required to complete sequential tire changing operations, the robotic tire changing machine may provide an operator with the option to bypass various measurement steps associated with a tire demount/mount cycle, and instead to utilize measurements associated with a previous wheel assembly from the same vehicle, in order to position various articulated tools in appropriate starting locations. In the event a "same as last" or "similar to last" tire demount/mount procedure is initiated on a wheel assembly of a different or unexpected size, one or more of the articulated tools of the robotic tire changing will either contact (or fail to contact) the wheel assembly at an expected spatial position, similar to the issues which can arise when detecting if the tire bead has separated from the rim bead seat (112) Upon detecting an unexpected contact (or lack of expected contact), the processing system is configured with software instructions to respond by suspending the current operation and querying the operator to either confirm intentions to proceed with a "same as last" or "similar to last" operation, and/or to confirm the dimensional configuration of the wheel assembly currently undergoing service (114).

Context sensitive actions by the robotic tire changing machines of the present disclosure are not limited to responses to the detection of abnormal operation conditions as noted above and shown in FIG. 3. In further embodiments, a robotic tire changing machine of the present disclosure is configured with software instructions to provide safety features and safety checks at various points during tire demount/mount operations to reduce the occurrence of events which could cause damage to the tire, wheel assembly, tire changing machine, or which could result in operator injury.

In a first example, it is critical that the robotic tire changing machine either automatically identify, or have an operator identify, the basic dimensions of the wheel rim for which the tire is to be mounted or demounted. Some wheel rims are either too large or too small for the robotic tire changing machine to successfully carry out an automatic tire mounting or demounting procedure, due to the operational limits of the various tool components. Tire mounting or demounting procedures may still be completed for such wheel rims, using either a fully manual mode of operation, or by skipping or altering various steps in an automatic procedure. Accordingly, a robotic tire changing machine of the present disclosure may, in an embodiment, be configured to warn an operator upon the detection of a wheel rim size exceeding predetermined operational limits, and provide the operator with one or more options to either complete a tire mount or demount procedure manually, or to carry out a modified automatic procedure by skipping or altering procedural steps as required to accommodate the specific dimensions of the wheel rim.

Figure 4:
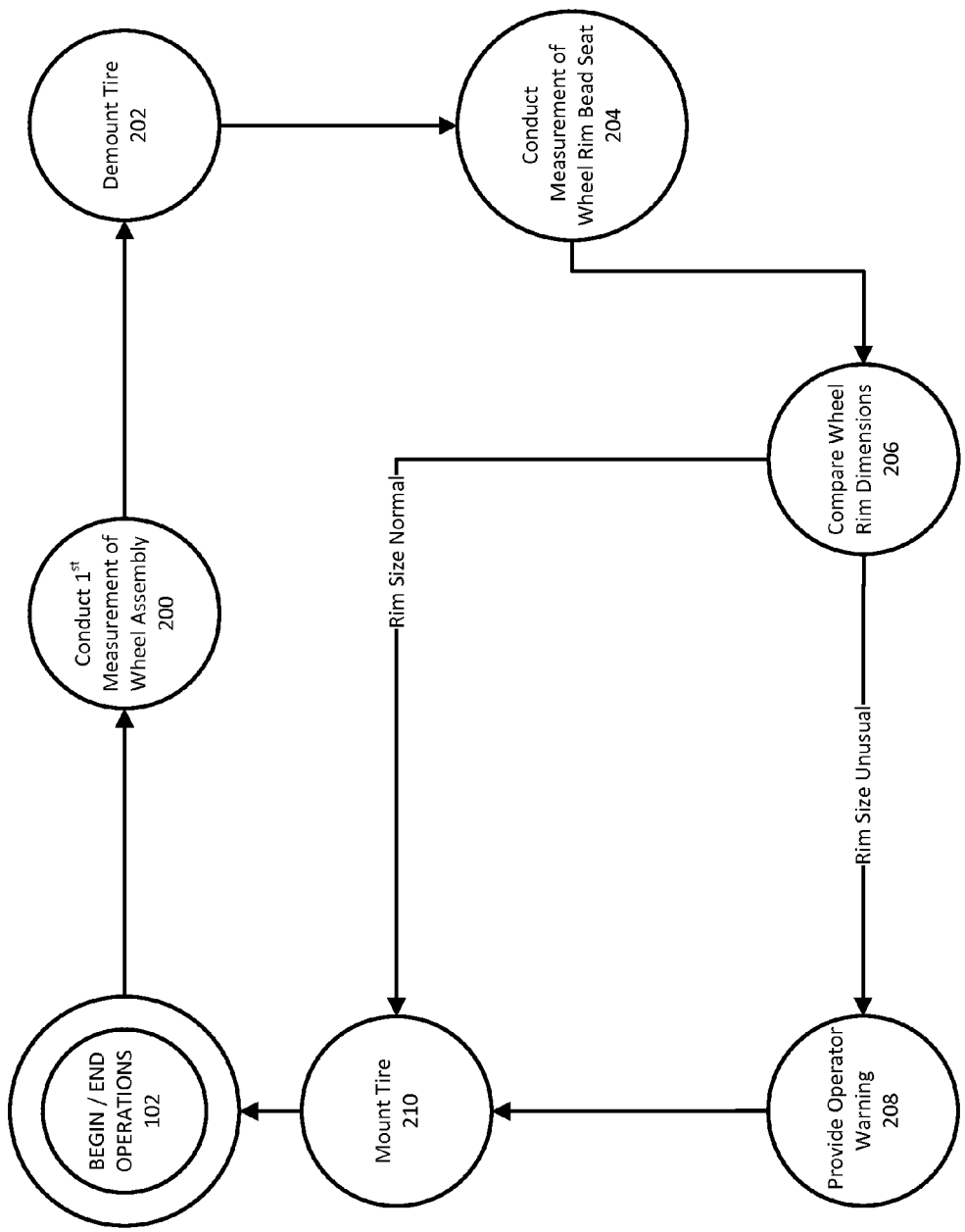
FIG. 4 is a diagrammatic illustration of an exemplary procedure for detecting and warning an operator of an unusual wheel rim dimension during a tire mounting procedure.

For example, when mounting tires to wheel rims, it is critical to ensure that the proper size tire is mounted to the proper size rim. Due to the flexibility of tire materials, it is possible under some circumstances to improperly mount a tire to a wheel rim which having the wrong diameter, results in what visually appears to be a properly mounted tire, but is actually a potentially dangerous situation. Tires mounted to the wrong size rims can fail to properly seat within the bead seat of the rim, and can separate from the rim with significant forces when inflated, damaging equipment and causing operator injury. To provide a safety check against such occurrences, one embodiment of the robotic tire changing machine processing system of the present disclosure shown in FIG. 4 is configured with software instructions to conduct, following the start of operations (102) an initial measurement of a wheel rim diameter (200) before demounting a tire (202), followed by a second, more accurate measurement of the rim after the tire has been demounted (204). This may be done for all wheel rims, or may be limited to applications where the initial measurement is within a selected range of wheel rim diameter measurement, for example, between 16" and 18". Following the initial measurement (200), the processing system is further configured with software instructions to acquire a second, more accurate, measurement (204) of the wheel rim diameter at the bead seat such as by using a bead roller assembly after the tire has been moved away from the roller and rim, or inspection with an optical sensor or measurement probe. Those of ordinary skill in the art will recognize that articulating tire tool assemblies, such as bead rollers, can be utilized to acquire measurements when configured with a variety of different sensors, such as, but not limited to, potentiometers, accelerometers, rotary encoders, and force transducers. If a comparison of the measurements (206) shows the second measurement of the wheel rim diameter does not correspond to the initial measurement, or if the wheel rim diameter measurements are confirmed at an unusual size, such as 16.5" or 17.5", the processing system is configured with software instructions to provide the operator with a suitable warning (208), as shown in FIG. 4, advising that care be taken to ensure a proper match between the tire size and the measured wheel rim before mounting operations commence 210, and normal operations continue.

In a further exemplary embodiment of the present disclosure, an embodiment of the robotic tire changing machine processing system is configured with software instructions to provide a safety feature in the form of a "panic stop" tool movement termination option. The processing system is configured to respond to multiple forms of operator input to terminate automated movement of one or more of the articulated components of the robotic tire changing machine in the event of an operator error or operator detection of an abnormal operating condition. For example, the robotic tire changing provides the operator with a "clear tools" operation in which all of the articulated tools are returned to their respective "home" positions in response to a single input. If the operator initiates this operation in error, or the operation commences while the tire is hooked on one of the articulated tools, it is necessary to terminate the procedure quickly before damage to the tire, machine, or operator ensues. The processing system is configured with software instructions to respond to a variety of non-specific operator inputs to terminate the "clear tools" procedure and cease movement of the articulated tools. These non-specific inputs may include actuation of a foot pedal control, movement of a control joystick in any direction, pressing of any key on a keyboard, and/or touching any location on an associated touch-screen display. Being responsive to non-specific operator inputs enables the processing system to safely respond to "panic stop" input from an operator who may have realized a problem was occurring, but who has not had time to react with a specific keystroke, controlled joystick movement, or correct foot pedal control movement.

In a further exemplary embodiment of the present disclosure, the robotic tire changing machine processing system is configured with software instructions to provide a safety feature in the form of a "sleep" mode after a period of non-use in which touch-sensitive controls, such as a touch-screen display are deactivated, requiring an operator to actuate a manual control mechanism, such as a control joystick or foot pedal, in order to "wake up" the robotic tire changing machine and resume normal operations. Deactivation of touch-sensitive controls prevents accidental operation of the machine in response to an insect landing or crawling across the touch-sensitive surface. Deactivation of touch-sensitive controls may further be triggered in the event that a touch-command or other manual input device has been activated continuously for an excessive period of time, such as by accidental contact with an object.

In a further exemplary embodiment of the present disclosure, the robotic tire changing machine processing system is configured with software instructions to assist operators who elect to utilize the machine with manual control of some or all of the articulated tools. Manual control may be necessary when the operator has selected (or the system has identified) a wheel assembly having dimensions which cannot be accommodated by the automated movement of the robotic tire changing machine components, but which can still be mounted/demounted with operator input. By monitoring signals which provide data identifying the spatial position of an articulated tool, such as relative to the known or expected edge of a wheel rim secured to the support, or the physical location of another tool/structure of the robotic tire changing machine, the processing system is configured with software instructions to alter the movement characteristics of the articulated tools (i.e., slowing movement speed, limiting movement ranges, altering movement directions, etc.) in response to the operator input. For example, as an articulated tool is manually directed to move close to a wheel rim (or other tool/structure) by an operator (such as through joystick control), the processing system is configured to establish a movement limit and/or to reduce maximum movement speed to assist the operator in avoiding direct contact between the articulated tool and the wheel rim (or other tool/structure). In a second example, the processing system is configured to monitor the position of an articulated tire hook tool relative to a wheel rim during manual movement, and to alter an operator directed movement by changing horizontal movement commands received from a joystick input into vertical movement commands when the tool hook is in close proximity to the wheel rim.

In another embodiment, the processing system can be configured with software instructions to automatically enter and exit various operations states and modes of operation for the robotic tire changing machine in response to monitored positions of one or more of the various articulated tools when under manual control by the operator. For example, by monitoring the position of the upper and lower bead rollers, the processing system can be configured to automatically enter and exit an auto-indent mode of operation during a tire changing procedure.

While described in the context of a robotic tire changing machine, one of ordinary skill in the art will recognize that the safety features and operator guidance features of the present disclosure can be readily adapted for use on traditional tire changing machines or other vehicle wheel service systems such as wheel balancers, if they are configured with a suitable operator interface and processing system.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for operating a tire changing machine having a processing system configured with software instructions to carry out at least one service procedure for mounting and/or demounting a tire from a wheel rim of a wheel assembly supported on a controlled spindle, comprising:
   detecting the occurrence of an abnormal operating condition during the service procedure;
   automatically responding to said detection of said abnormal operating condition with a response which is selected based on at least one of a current operating state in which the tire changing machine is in, and a current operational step of said service procedure; and
   wherein said selected response is chosen from a set of responses consisting of providing operator guidance, providing an operator warning, carrying out at least one additional procedural steps during the service procedure, suspending said service procedure to await an operator action, limiting movement of an articulated component during the service procedure, entering a manual operation mode, altering parameters for continued service procedure operation, and altering parameters for a subsequent "same as last" or "similar to last" service procedure.

2. The method of claim 1 wherein said detected abnormal operating condition is selected from a set of operating conditions consisting of a failure of an articulated tool to move to a designated location, a movement of an articulated tool or rotating component at an incorrect speed, stalling of a rotating component, an unexpected operator input, identification of an abnormal wheel assembly characteristic, detection of a wheel assembly component at an unexpected location, and a failure to detect a wheel assembly component at an expected location.

3. A tire changing machine having a processing system configured with software instructions to carry out a service procedure associated with mounting and/or demounting a tire from a wheel rim of a wheel assembly supported on a controlled spindle, comprising:
   the processing system further configured with software instructions to detect the occurrence of an abnormal operating condition during the service procedure;
   wherein the processing system is further configured with software instructions to respond to the detection of said abnormal operating condition by selecting a response associated with at least one of a current operating state in which the tire changing machine is in, and a current operational step of an ongoing service procedure;
   wherein said selected response requires an operator interaction with the processing system prior to completing the tire mounting or demounting procedure; and
   wherein said selected response is selected from a set of responses consisting of providing operator guidance, providing an operator warning, carrying out at least one additional procedural steps during the service procedure, altering a sequence of remaining procedural steps in the service procedure, suspending a procedure step to await an operator action, or limiting movement of an articulated component during the service procedure.

4. The tire changing machine of claim 3 wherein said current operational step includes rotationally driving the wheel assembly mounted to the spindle shaft while applying a vertical pressure to the tire mounted on the wheel assembly with an articulated pusher tool;
   wherein said abnormal operating condition is an occurrence of the articulated pusher tool having a rotational speed which differs from the rotational speed of the spindle; and
   wherein said processing system is configured with software instructions to respond to the detection of said abnormal operating condition by prompting the operator to either change a position of the articulated pusher tool or to restart the current operational step with the wheel assembly at a different rotational position.

5. The tire changing machine of claim 3 wherein said current operational step is the initial breaking of a tire bead to demount the tire from the wheel rim;
   wherein said abnormal operating condition is either the detection of a sidewall of the tire at a position which is displaced from an upper rim edge of the wheel rim or the absence of sidewall detection within an expected spatial region; and
   wherein said processing system is configured with software instructions to respond to the detection of said abnormal operating condition by querying the operator for confirmation regarding the current state of the tire bead.

6. The tire changing machine of claim 3 wherein said current operational step is a top bead demount in a wheel demounting operation;
   wherein said abnormal operating condition is a failure of an articulated tire hook to draw a tire bead to a determined position;
   wherein said processing system is configured with software instructions to respond to the detection of said abnormal condition by prompting the operator to move an articulated pusher tool to a starting position which is approximately opposite from a rotational position of a tire mount head tool; and
   wherein said processing system is further configured with software instructions to subsequently engage the articulated pusher tool with the tire and re-attempt to draw the tire hook to the determined position.

7. The tire changing machine of claim 6 wherein said processing system is configured with software instructions to prompt the operator to move the articulated pusher tool to said starting position.

8. The tire changing machine of claim 7 wherein said processing system is configured with said software instructions to continuously provide said operator prompt until the articulated pusher tool is determined by the processing system to be positioned within a defined region which is opposite from the rotational position of the tire mount head tool.

9. The tire changing machine of claim 3 wherein said current operational step is a top bead demount in a wheel demounting operation;
   wherein said abnormal operating condition is a stall of the rotational movement of the spindle and supported wheel assembly after the top bead has been drawn over the wheel rim upper edge;
   wherein said processing system is configured with software instructions to respond to the detection of said abnormal condition by prompting the operator to move an articulated pusher tool to an identified starting position; and
   wherein said processing system is further configured with software instructions to subsequently engage the articulated pusher tool with the tire at said starting position before re-attempting to complete the necessary rotational movement of the spindle and wheel assembly required to demount the tire from the rim.

10. The tire changing machine of claim 3 wherein said abnormal operating condition is the detection of an operational step exceeding an established period of time; and
    wherein said processing system is configured with software instructions to respond to the detection of said abnormal operating condition by providing the operator with a visual display of at least one option for receiving assistance with said operational step.

11. The tire changing machine of claim 3 wherein said abnormal operating condition is either the detection of contact between a articulated tool assembly and the wheel rim or tire at an unexpected location, or an absence of expected contact between an articulated tool assembly and the wheel rim or tire when contact was expected at a given location; and
    wherein said processing system is configured with software instructions to respond to the detection of said abnormal operating condition by querying the operator to confirm a configuration of the wheel assembly.

12. The tire changing machine of claim 3 wherein said abnormal operating condition is the detection of abnormal or unexpected operator input which is inconsistent with a current operational step; and
    wherein said processing system is configured with software instructions to respond to the detection of said abnormal operating condition by querying the operator to confirm an input command and/or to provide the operator with procedural guidance.

13. The tire changing machine of claim 3 wherein said abnormal operating condition is the detection of a wheel rim diameter within a tolerance of one of 16.5 inches, 17.5 inches, or 19.5 inches; and
    wherein said processing system is configured with software instructions to respond to the detection of said abnormal operating condition by providing a tire and rim size cautionary warning to an operator.

14. The tire changing machine of claim 3 wherein said abnormal operating condition is either the detection of, or identification of, a wheel rim dimension outside of an operational range for at least one articulated component; and
    wherein said processing system is configured with software instructions to respond to said abnormal operating condition by providing an operator with an option to proceed in a manual operating mode.

15. A tire changing machine having a processing system configured with software instructions to carry out service procedures for demounting a tire from a wheel rim of a wheel assembly, comprising:
    the processing system further configured with software instructions to obtain an measure a diameter of the wheel rim; and
    wherein said processing system is further configured to provide a signal to an operator in response to at least one of said measurement of diameter corresponding to a selected diameter and said measurement of diameter within a predetermined range of dimensions.

16. The tire changing machine of claim 15 wherein said signal is at least one of an audible warning and a visual warning to the operator in response to said wheel rim having a measured diameter of either 16.5 inches, 17.5 inches, or 19.5 inches.

17. The tire changing machine of claim 15 wherein the processing system is further configured with software instructions to obtain a subsequent measure of the diameter of the wheel rim after moving the tire away from the wheel rim; and
    wherein said processing system is further configured to provide said signal to an operator in response to a difference between said measures of the diameter.

18. A method for operating a tire changing machine having a processing system configured with software instructions to carry out the procedures for demounting a tire from a wheel rim of a wheel assembly, comprising:
    automatically acquiring a measurement of diameter of the wheel rim; and
    providing a warning to an operator in response to at least one of said measurement of diameter corresponding to at least a predetermined dimension, and said measurement of diameter within a predetermined range of dimensions.

19. The operating method of claim 18 wherein said predetermined dimension is one of a set of predetermined dimensions equal to 16.5 inches, 17.5 inches, and 19.5 inches.

20. The operating method of claim 18 further including the step of acquiring, before providing said warning, a subsequent measurement of the diameter of the wheel rim after breaking of a tire bead for any wheel rim having an acquired measurement of diameter either within a tolerance of said predetermined dimension or within said predetermined range of dimensions; and
    using said subsequent measurement of the diameter in providing said warning.

21. The method of claim 20 wherein said subsequent measurement of diameter is acquired at an exposed bead seat surface of said wheel rim.

* * * * *